(12) United States Patent
Cook

(10) Patent No.: US 9,612,136 B1
(45) Date of Patent: Apr. 4, 2017

(54) ABSOLUTE POSITION ENCODER INCLUDING A REDUNDANT SPATIAL PHASE SIGNAL

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 21 days.

(21) Appl. No.: 14/871,386

(22) Filed: Sep. 30, 2015

(51) Int. Cl.
*G01D 5/347* (2006.01)

(52) U.S. Cl.
CPC .............................. *G01D 5/34776* (2013.01)

(58) Field of Classification Search
CPC ............... G01D 5/347; G01D 5/34707; G01D 5/34776; G01B 7/003; G01B 7/14; H01L 27/14625
USPC ..... 250/231.13, 231.14, 231.18; 324/207.11, 324/207.17, 207.24; 341/9, 11, 13, 15
See application file for complete search history.

(56) References Cited

U.S. PATENT DOCUMENTS

| | | | |
|---|---|---|---|
| 3,882,482 A | 5/1975 | Green et al. | |
| 4,109,389 A | 8/1978 | Balcom et al. | |
| 4,414,754 A | 11/1983 | Lapeyre | |
| 4,964,727 A | 10/1990 | Huggins | |
| 5,010,655 A | 4/1991 | Rieder et al. | |
| 5,237,391 A | 8/1993 | Huggins | |
| 5,279,044 A | 1/1994 | Bremer | |
| 5,442,166 A | 8/1995 | Hollmann | |
| 5,506,579 A | 4/1996 | Spaulding | |
| 5,773,820 A | 6/1998 | Osajda et al. | |
| 5,841,274 A | 11/1998 | Masreliez et al. | |
| 5,886,519 A | 3/1999 | Masreliez et al. | |
| 5,894,678 A | 4/1999 | Masreliez et al. | |
| 5,965,879 A | 10/1999 | Leviton | |
| 5,973,494 A | 10/1999 | Masreliez et al. | |
| 6,002,250 A | 12/1999 | Masreliez et al. | |

(Continued)

FOREIGN PATENT DOCUMENTS

WO      95/05707 A1    2/1995

*Primary Examiner* — Kevin Pyo
(74) *Attorney, Agent, or Firm* — Seed Intellectual Property Law Group LLP

(57) ABSTRACT

An electronic absolute position encoder is provided having a scale, a detector, and a signal processor configured to determine an absolute position of the detector along the scale. The scale includes a signal modulating scale pattern comprising a periodic pattern component and a gradual pattern variation component. The detector includes N spatial phase sensing elements (e.g., conductive windings) and at least one reference sensing element, which is spaced apart along the measuring axis direction by a distance corresponding to an integer multiple of 360 degrees of spatial phase shift relative to a first one of the N spatial phase sensing elements. A first reference signal from the first reference sensing element and a first signal from the first one of the N spatial phase sensing elements include nominally similar signal contributions from the periodic pattern component, and a difference between the two signals is due to a difference in their signal contributions from the gradual pattern variation component. The difference may be used to determine a scale factor M1 for a gradual signal variation exhibited by the detector signals output from the detector.

20 Claims, 9 Drawing Sheets

(56) References Cited

U.S. PATENT DOCUMENTS

| | | | |
|---|---|---|---|
| 6,011,389 A | 1/2000 | Masreliez et al. | |
| 6,335,618 B1 | 1/2002 | Nahum | |
| 7,253,395 B2 | 8/2007 | Hare et al. | |
| 7,368,705 B2 | 5/2008 | Hare et al. | |
| 7,834,310 B2 | 11/2010 | Jones et al. | |
| 8,309,906 B2 | 11/2012 | Kapner et al. | |
| 9,435,663 B2 * | 9/2016 | Cook | G01D 5/2066 |
| 2014/0184202 A1 * | 7/2014 | Horiguchi | G01D 5/24438 324/207.11 |
| 2015/0362336 A1 | 12/2015 | Cook | |

\* cited by examiner

ABSOLUTE POSITION ENCODER INCLUDING A REDUNDANT SPATIAL PHASE SIGNAL

BACKGROUND

Technical Field

The invention relates generally to precision measurement instruments, and particularly to absolute position encoders that may be utilized in handheld instruments such as calipers.

Description of the Related Art

Various position transducers are available, such as optical, capacitive, and inductive transducers. These transducers may use a transmitter and a receiver in a read head to measure its movement relative to a scale. Some types of transducers are sensitive to contamination, such that using them in manufacturing or shop environments is impractical. In contrast, inductive sensors may be immune to contamination by particles, oil, water, and other fluids. U.S. Pat. No. 6,011,389 (the '389 patent), which is hereby incorporated herein by reference in its entirety, describes an induced current position transducer usable in high accuracy applications. U.S. Pat. Nos. 5,973,494 (the '494 patent) and 6,002,250 (the '250 patent), which are each hereby incorporated herein by reference in their entireties, describe incremental position inductive calipers and linear scales, including signal generating and processing circuits. U.S. Pat. Nos. 5,886,519, 5,841,274, and 5,894,678, which are each hereby incorporated herein by reference in their entireties, describe absolute position inductive calipers and electronic tape measures using the induced current transducer. As described in these patents, the induced current transducer is readily manufactured using known printed circuit board technology.

Different implementations of the induced current transducer (and other types of transducers) may be implemented as either incremental or absolute position encoders. In general, incremental position encoders utilize a scale that allows the displacement of a read head relative to a scale to be determined by accumulating incremental units of displacement, starting from an initial point along the scale. However, in certain applications, such as those where encoders are used in low power consumption devices, it is more desirable to use absolute position encoders. Absolute position encoders provide a unique output signal, or combination of signals, at each position (of a read head) along a scale. They do not require continuous accumulation of incremental displacements in order to identify a position. Thus, absolute position encoders allow various power conservation schemes.

In addition to the '519, '274, and '678 patents described above for the absolute induced current transducer, U.S. Pat. Nos. 3,882,482, 5,965,879, 5,279,044, 5,237,391, 5,442,166, 4,964,727, 4,414,754, 4,109,389, 5,773,820, 5,010,655, 6,335,618, and U.S. Patent Publication No. 2015/0362336 (Ser. No. 14/303,266, filed Jun. 12, 2014; 2014 August) also disclose various encoder configurations and/or signal processing techniques relevant to absolute encoders, and are each hereby incorporated herein by reference in their entirety. However, many of these disclosed systems fail to teach configurations which are robust against measurement errors due to an unintended gap variation introduced between the read head and the scale or an unintended roll, pitch and/or yaw of the read head relative to the axis of the scale. For example, as shown in FIG. 1, while the read head 164 and the scale 102 are configured to maintain a certain designed (intended) gap therebetween, uniformly along the length of the scale 102, to permit sliding movement of the read head relative to the scale for proper function of the caliper 100, the actual gap may be greater or smaller than the designed gap and may be non-uniform along the axis of the scale due to manufacturing imperfection, for example. As further shown in FIG. 1, while the axis of the read head 164 is designed to lie in parallel to the axis of the scale 102, the actual axis of the read head may be rotated around the X-, Y- and/or Z-axes to have roll, pitch and/or yaw due to manufacturing imperfection, for example. Even minor deviations in terms of a gap, roll, pitch and/or yaw may lead to measurement errors not desirable in high-precision absolute position encoders such as calipers. Improved configurations of absolute encoders that are robust against these types of measurement errors would be desirable.

BRIEF SUMMARY

This summary is provided to introduce a selection of concepts in a simplified form that are further described below in the Detailed Description. The summary is not intended to identify key features of the claimed subject matter, nor is it intended to be used as an aid in determining the scope of the claimed subject matter.

An electronic absolute position encoder is provided that can be embodied, for example, in a high-precision caliper. The encoder includes a scale comprising a first scale track extending along a measuring axis direction and including a first signal modulating scale pattern. The first signal modulating scale pattern includes a periodic pattern component and a gradual pattern variation component combined with or superimposed on the periodic pattern component. The periodic pattern component includes at least one of a periodic area modulation or a periodic material characteristic modulation as a function of position along the first scale track. The gradual pattern variation component includes at least one of a gradual area variation or a gradual material characteristic variation as a function of position over a first range along the first scale track.

The electronic absolute position encoder further includes a detector including at least a first set of sensing elements (which together form a read head) aligned along the first scale track. The first set of sensing elements are configured to provide a first set of detector signals, which respond to the first signal modulating scale pattern including the periodic and gradual pattern components and which are indicative of a position of the detector along the first scale track.

The electronic absolute position encoder still further includes a signal processor configured to determine an absolute position of the detector along the scale based on the detector signals from the detector.

According to various embodiments of the present invention, the first set of sensing elements of the detector includes N spatial phase sensing elements (e.g., conductive windings) and additionally at least a first reference sensing element (e.g., an additional conductive winding). The N spatial phase sensing elements are configured to provide N respective signals and are located at their N respective locations along the measuring axis direction on the detector. Each of the N locations corresponds to sensing a unique Nth spatial phase of the periodic pattern component, and a corresponding Nth position along the gradual pattern variation component.

The additional first reference sensing element is located at a first reference location on the detector that is spaced apart along the measuring axis direction by a first reference distance corresponding to an integer multiple of 360 degrees of spatial phase shift relative to a first spatial phase sensing element of the N spatial phase sensing elements. The first spatial phase sensing element provides a first signal corresponding to a first spatial phase of the periodic pattern component, and a first position along the gradual pattern variation component.

The first reference sensing element, located at the first reference location on the detector, thus provides a first reference signal corresponding to the first spatial phase of the periodic pattern component and a corresponding first reference position along the gradual pattern variation component. The first signal and the first reference signal include nominally similar signal contributions from the periodic pattern component corresponding to the first spatial phase (because the first spatial phase sensing element and the first reference sensing element are spatial-phase shifted by an integer multiple of 360 degrees) and a difference between the first signal and the first reference signal is due to a difference in their signal contributions from the gradual pattern variation component.

The first signal and the first reference signal are not statically connected to one another and contribute to independent input signals for the signal processor. The difference between the first signal and the first reference signal due to the first reference distance is a first signal difference indicative of a scale factor M1 for a first gradual signal variation exhibited by the first set of detector signals, wherein the first gradual signal variation is due to the gradual pattern variation component as a function of the position of the detector along the first scale track.

The scale factor M1 derived by the electronic absolute position encoder as described above may then be used to determine the slope of the first gradual signal variation, which is may be used to calculate an absolute position of the read head relative to the scale. In prior art encoders, an unintended gap introduced between the read head and the scale would cause the slope of a gradual signal variation to deviate from an intended slope, requiring determination of the actual slope in order to compensate for measurement errors due to the gap deviation. The novel configuration of the electronic absolute position encoder including the additional reference sensing element, which provides a redundant spatial phase signal that can be used to calculate the scale factor M1, is capable of readily measuring the actual slope of a gradual signal variation exhibited by the read head.

In accordance with further exemplary embodiments, the detector includes an additional second reference sensing element which, in cooperation with a second spatial phase sensing element of the N spatial phase sensing elements, provides a second signal difference indicative of the scale factor M1 for the gradual signal variation. Still further, the detector may include a third reference sensing element which, in cooperation with a third spatial phase sensing element of the N spatial phase sensing elements, provides a third signal difference indicative of the scale factor M1 for the gradual signal variation. A combination of the first, second and/or third signal differences may then be used to determine the scale factor M1 for the gradual signal variation with improved accuracy.

In accordance with still further exemplary embodiments, the scale includes, in addition to the first scale track, a second scale track extending along the measuring axis direction including a second signal modulating scale pattern in parallel to the first scale track. The second signal modulating scale pattern includes a periodic pattern component and a gradual pattern variation component combined with or superimposed on the periodic pattern component. The detector includes, in addition to the first set of sensing elements, a second set of sensing elements aligned along the second scale track in parallel to the first set of sensing elements. The second set of sensing elements are configured to provide a second set of detector signals which respond to the second signal modulating scale pattern and which are indicative of a position of the detector along the second scale track. The second set of sensing elements includes K spatial phase sensing elements and additionally at least a primary reference sensing element. The primary reference sensing element is located on the detector at a location spaced apart by a distance corresponding to an integer multiple of 360 degrees of spatial phase shift relative to a primary spatial phase sensing element of the K spatial phase sensing elements. The primary spatial phase sensing element provides a primary signal corresponding to a primary spatial phase of the periodic pattern component of the second scale track, and a primary position along the gradual pattern variation component of the second scale track. The primary reference sensing element is configured to provide a primary reference signal corresponding to the primary spatial phase of the periodic pattern component of the second scale track, and a corresponding primary reference position along the gradual pattern variation component of the second scale track. The primary signal and the primary reference signal include nominally similar signal contributions from the periodic pattern component of the second scale track (because the primary spatial phase sensing element and the primary reference sensing element are spatial-phase shifted by an integer multiple of 360 degrees) and a difference between the primary signal and the primary reference signal is due to a difference in their signal contributions from the gradual pattern variation component of the second scale track. The difference between the primary signal and the primary reference signal is a primary signal difference indicative of a scale factor M2 for a second gradual signal variation exhibited by the second set of detector signals, wherein the second gradual signal variation is due to the gradual pattern variation component as a function of the position of the detector along the second scale track.

The scale factors M1 and M2 derived by the electronic absolute position encoder as described above may then be used to compensate for (e.g., cancel out) measurement errors that may otherwise arise due to roll, pitch and/or yaw of the read head relative to the measuring axis of the scale. For example, the scale factors M1 and M2 may be used to provide the actual slope of the first gradual signal variation and the actual slope of the second gradual signal variation, respectively, wherein the first and second gradual signal variations respectively contain error components due to roll, pitch and/or yaw of the read head relative to the scale. When M2 is configured to be approximately equal to the negative of M1, M1 and M2 may be combined to cancel out these error components due to roll, pitch and/or yaw of the read head.

DETAILED DESCRIPTION

Figure 1:
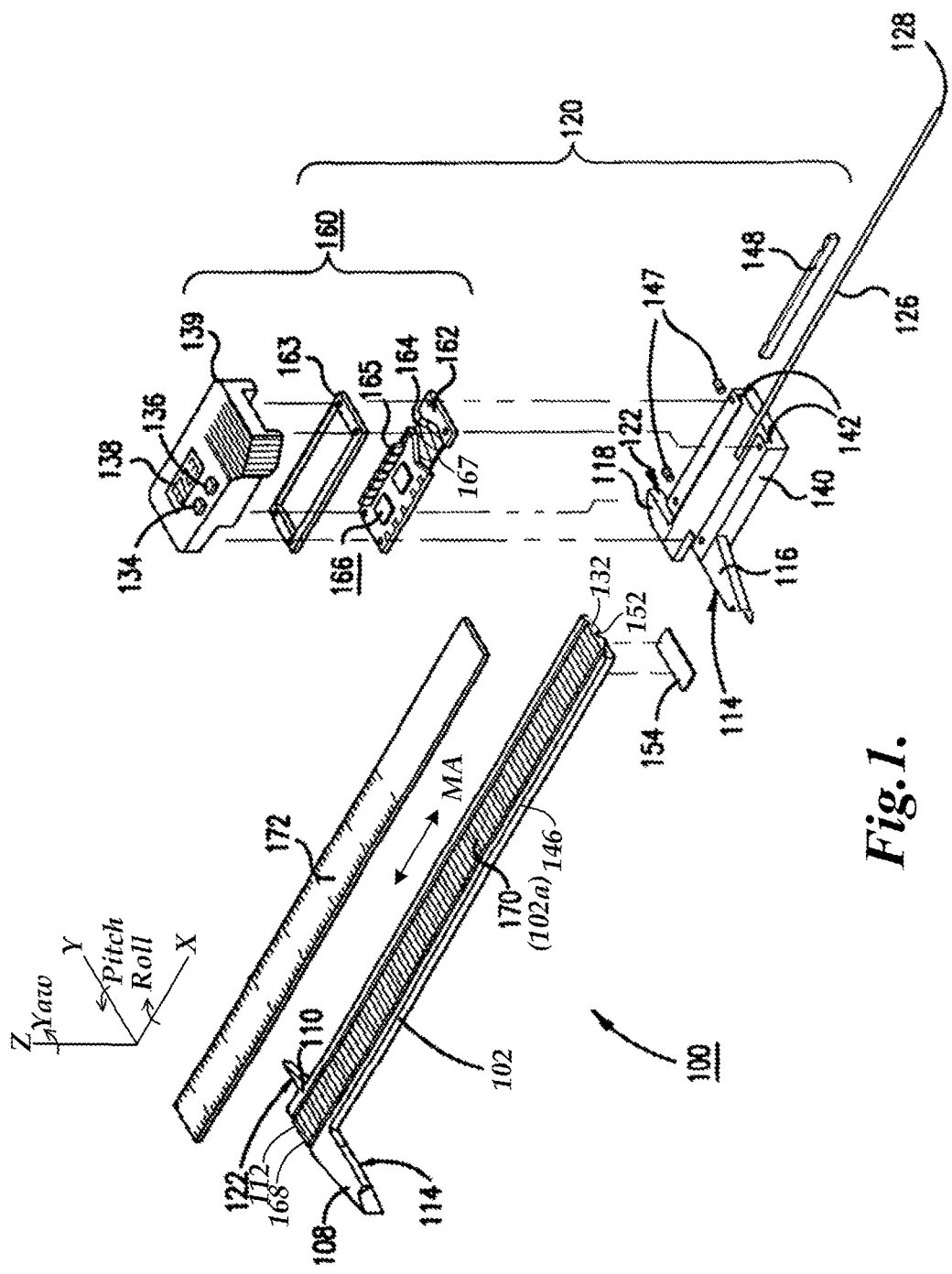
FIG. 1 is an exploded isometric view diagram of a hand tool caliper, incorporating an embodiment of the present invention including a scale and a detector (read head).

FIG. 1 is an exploded isometric view diagram of a hand tool type caliper 100 including a scale 102 having a first scale track 102a, which extends along a measuring axis (MA) direction and includes a signal modulating scale pattern 170. The caliper 100 is one example of products suited for incorporating/embodying an electronic absolute position encoder of the present invention. As shown in FIG. 1, the scale 102 may include a substrate 168, on which the signal modulating scale pattern 170 may be formed on or attached to, and which may consist of a rigid or semi-rigid bar having a generally rectangular cross section. A pair of laterally projecting, fixed jaws 108 and 110 are integrally formed near a first end 112 of the scale 102. A corresponding pair of laterally projecting movable jaws 116 and 118 are formed on a slider assembly 120 which includes a read head or a detector 164. In the present description, the terms "read head" and "detector" are used interchangeably and synonymously.

The outside dimensions of an object are measured by placing the object between a pair of engagement surfaces 114 on the jaws 108 and 116. Similarly, the inside dimensions of an object are measured by placing the jaws 110 and 118 within an object. The engagement surfaces 122 of the jaws 110 and 118 are positioned to contact the surfaces on the object to be measured. The engagement surfaces 122 and 114 are positioned so that when the engagement surfaces 114 of the jaws 108 and 116 are contacting each other, the engagement surfaces 122 of the jaws 110 and 118 are aligned with each other. In this position, the zero position (not shown) of both the outside and inside dimensions measured by the caliper 100 should be zero.

The caliper 100 also includes a depth bar 126 which is attached to the slider assembly 120. The depth bar 126 projects longitudinally from the scale 102 (received in the slider assembly 120) and terminates at an engagement end 128. The length of the depth bar 126 is such that the engagement end 128 is flush with a second end 132 of the scale 102 when the caliper 100 is at the zero position. By resting the second end 132 of the scale 102 on a surface in which a hole is formed and extending the depth bar 126 into the hole until the end 128 touches the bottom of the hole, the caliper 100 is able to measure the depth of the hole.

Whether a measurement is made using the outside measuring jaws 108 and 116, the inside measuring jaws 110 and 118, or the depth bar 126, the measured dimension is displayed on a conventional digital display 138, which is mounted in a cover 139 of the slider assembly 120. A pair of push button switches 134 and 136 are also mounted in the cover 139. The switch 134 turns on and off a signal processing and display electronic circuit 166 of the slider assembly 120. The switch 136 is used to reset the display 138 to zero.

As shown in FIG. 1, the slider assembly 120 includes a base 140 with a guiding edge 142. The guiding edge 142 contacts a side edge 146 of the scale 102 when the slider assembly 120 straddles the scale 102. This ensures accurate operation of the caliper 100. A pair of screws 147 bias a resilient pressure bar 148 against a mating edge of the scale 102 to eliminate free play between the slider assembly 120 and the scale 102.

The depth bar 126 is inserted into a depth bar groove 152 formed on an underside of the scale 102. The depth bar groove 152 extends along the underside of the scale 102 to provide clearance for the depth bar 126. The depth bar 126 is held in the depth bar groove 152 by an end stop 154. The end stop 154 is attached to the underside of the scale 102 at the second end 132. The end stop 154 also prevents the slider assembly 120 from inadvertently disengaging from the scale 102 at the second end 132 during operation.

The slider assembly 120 also includes a pickoff assembly 160 mounted on the base 140 above the scale 102. Thus, the base 140 and pickoff assembly 160 move as a unit. The pickoff assembly 160 includes a substrate 162, such as a conventional printed circuit board. The substrate 162 bears an eddy current read head (detector) 164 on its lower surface (which faces the signal modulating scale pattern 170). The signal processing and display electronic circuit 166 is mounted on an upper surface of the substrate 162. A resilient seal 163 is compressed between the cover 139 and the substrate 162 to prevent contamination of the signal processing and display electronic circuit 166. The underside of the read head 164 is covered by a thin, durable, insulative coating 167 (which in one specific illustrative example may be approximately 50 mm thick). A protective insulating layer 172 (which in one specific illustrative example may be at most approximately 100 mm thick) may cover the signal modulating scale pattern 170. The protective layer 172 can include printed markings, as shown in FIG. 1.

The slider assembly 120 carries the detector 164 so that it is slightly separated from the scale 102 by an air gap formed between the respective insulative coatings 167 and 172. In one specific illustrative example the air gap may be approximately on the order of 0.5 mm.

Figure 2:
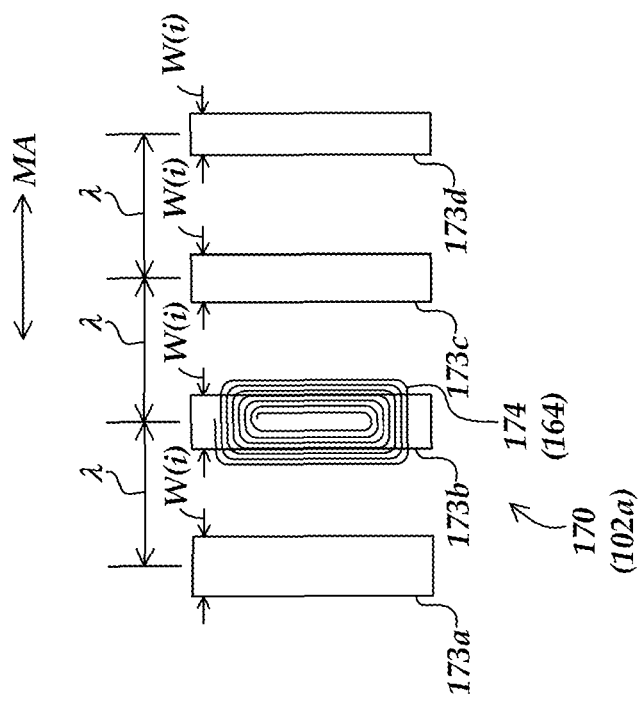
FIG. 2 is a top plan view diagram of a portion of a scale including four scale elements spaced apart by a spatial wavelength "A," relative to which a detector comprising a sensing element (a conductive winding) is positioned to produce a detector signal.

Referring additionally to FIG. 2, the first scale track 102a of the scale 102 extends along the measuring axis (MA) direction and includes the signal modulating scale pattern 170, a segment of which is represented in FIG. 2 by four scale elements 173a-173d. In terms of its signal inducing function, the signal modulating scale pattern 170 comprises a periodic pattern component and a gradual pattern variation component. The periodic pattern component and the gradual pattern variation component respectively produce (or induce) signals (or signal contributions) in a sensing element 174 that is included in the detector 164. In the present description, the terms "signal" and "signal contribution" may be used interchangeably, and "signal" may denote a signal that may not be isolated in normal operation, i.e., a signal that may be combined or mixed with other signals due to a temporary or permanent connection configuration, for example.

The detector 164 and the signal modulating scale pattern 170 may form an eddy current transducer which operates in one implementation by generating changing magnetic fields. The changing magnetic fields, which may be provided in some embodiments by providing a changing current in the sensing element 174, to induce circulating currents, known as eddy currents, in one or more adjacent scale elements 173a-173d of the signal modulating scale pattern 170 that are within the changing magnetic field. The scale elements 173a-173d are formed of conductive material, such as metallic (e.g., copper) plates. The effective inductance of the sensing element 174 of the detector 164 is influenced by the respective eddy currents of the respective scale elements 173a-173d to correspondingly provide absolute position detector signals having a signal characteristic that varies along an absolute signal range of the first scale track 102a to uniquely indicate respective positions of the sensing element 174 along the absolute signal range.

As described above, the signal modulating scale pattern 170 includes a periodic pattern component and a gradual pattern variation component. In FIG. 2, the periodic pattern component refers to a periodic area modulation provided by periodic arrangement along the measuring axis (MA) direction of the four scale elements 173a-173d, which are equidistantly spaced apart by a spatial wavelength $L=\lambda$. The periodic pattern component thus produces signal contributions indicative of periodic increments along the first scale track 102a. The periodic pattern component includes the periodic area modulation as a function of position along the first scale track 102a. The periodic pattern component may alternatively or additionally refer to a periodic material characteristic modulation provided by configuring the scale elements 173a-173d to have the same material characteristic in terms of its signal response. For example, the scale elements 173a-173d may be coated with the same metallic material having the same signal response characteristic, which appears periodically along the first scale track 102a. In summary, the periodic pattern component includes at least one of a periodic area modulation or a periodic material characteristic modulation as a function of position along the first scale track 102a.

In FIG. 2, the gradual pattern variation component, on the other hand, refers to a gradual area variation provided by gradually varying the effective width dimension W(i) of the scale elements 173a-173d over an absolute signal range along the first scale track 102a, where i refers to the i-th scale element along the measuring axis MA. In FIG. 2, the effective width dimension W(i) is gradually decreased from left to right, from the scale element 173a to the scale element 173d according to a varying duty cycle with a constant spatial wavelength $L=\lambda$. In various exemplary embodiments, the effective width dimension W varies between adjacent scale elements preferably by at most 5%, and further preferably by at most 2%. The varying effective width dimension W(i) provides a different eddy current response (or a different eddy current effect on the detector signal) depending on the value of W(i). The gradual pattern variation component thus produces signal contributions that vary along the first scale track 102a. That is, the gradual pattern variation component includes the gradual area variation as a function of position along the first scale track 102a. In other embodiments, the gradual area variation may be provided by gradually varying other dimensions of the scale elements 173a-173d such as their effective length dimension along Y axis and/or their effective depth/height dimension along Z axis (by forming the scale elements 173a-173d as recesses/plateaus, for example). Still further, any one or more of the gradual area variations (e.g., variations of effective width/length/depth/height dimensions) may be combined to form another type of gradual area variation. The gradual pattern variation component may alternatively or additionally refer to a gradual material characteristic variation provided by configuring the scale elements 173a-173d to have varying material characteristics (e.g., using different metallic materials, and/or different thicknesses or mixtures of such materials, or the like) in terms of their effect on the detector signal response. In summary, the gradual pattern variation component includes at least one of a gradual area variation or a gradual material characteristic variation as a function of position along the first scale track 102a.

In various implementations, the scale 102 and/or the signal modulating scale pattern 170 may be fabricated utilizing various techniques. For example, in one implementation the substrate 168 may be a conducting bulk material (e.g., aluminum). The periodic pattern component and the gradual pattern variation component are then be provided in a combined or superimposed manner to by form machining or otherwise forming the substrate 168 to provide the first signal modulating scale pattern 170. For example, the scale elements 173a-173d are formed as raised areas by machining or stamping or etching the substrate 168 and they are periodically arranged to provide the periodic pattern component, with one or more dimensions and/or material characteristics of the scale elements 173a-173d varied along the absolute signal range to thereby provide the gradual pattern variation component. In another implementation the substrate 168 may be a non-conductive printed circuit board substrate with a conductive (e.g. copper) layer deposited or laminated onto it. The periodic pattern component and the gradual pattern variation component are then provided in a combined or superimposed manner, by machining or otherwise forming the conductive layer, to provide the first signal modulating scale pattern 170. For example, the scale elements 173a-173d are formed as conductive areas by photoresist patterning and etching and they are periodically arranged to provide the periodic pattern component, with one or more dimensions and/or material characteristics of the scale elements 173a-173d varied along the absolute signal range to thereby provide the gradual pattern variation component.

Figure 3A:
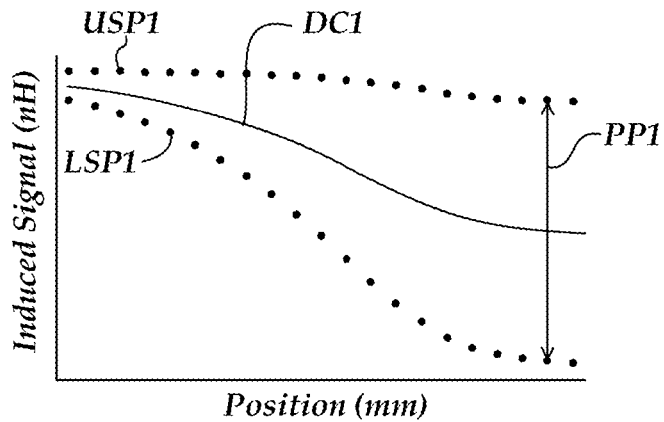
FIGS. 3A-3C are diagrams of schematically represented detector signals output from three different configurations of detectors (e.g. in a read head), respectively, as used in combination with a similar signal modulating scale pattern.
Figure 3B:
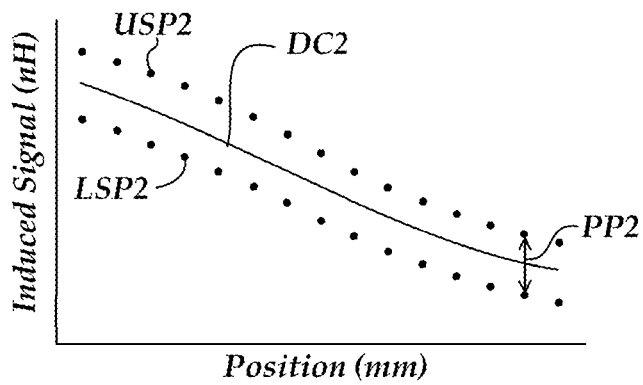
Figure 3C:
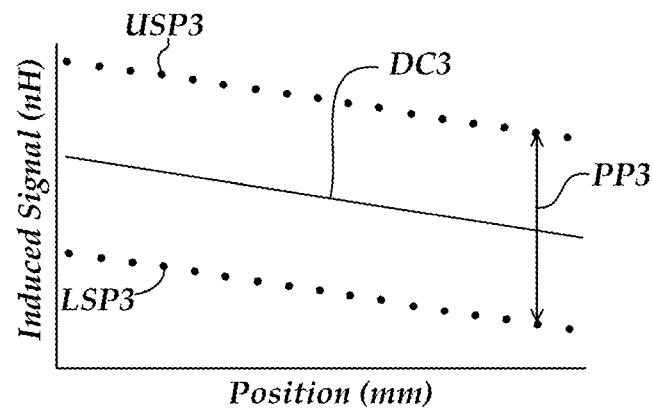

FIGS. 3A-3C are diagrams of schematically represented detector signals output from three different configurations of sensing elements 174 (e.g. as used in three different embodiments of a detector in a read head), respectively, as used in combination with a signal modulating scale pattern 170 that is similar for the three diagrams. FIG. 3A shows the envelope of the spatially periodic detector signals (represented by the apparent effective inductance, in nH) output from a signal sensing element 174, which is a conductor winding consisting of 3 turns, wherein the effective width dimension W(i) of the scale elements 173a-173d is varied by 1% along positions (mm) over an absolute signal range along this example of the first scale track 102a. The envelope of the spatially periodic detector signals is characterized by upper signal peaks USP1 that slightly decrease and lower signal peaks LSP1 that more steeply decrease along a curved lines, with a peak-to-peak amplitude PP1 strongly varying (increasing toward increasing position) over the absolute signal range along the first scale track 102a. A periodic detector signal due to the periodic pattern component of this example of the first scale track 102a mostly contributes to the peak-to-peak amplitude PP1, which includes a DC offset value DC1 that varies (decreases) over the absolute signal range along the first scale track 102a.

FIG. 3B shows detector signals output from the detector 164 comprising the signal sensing element 174, which is a conductor winding consisting of 10 turns, wherein the effective width dimension W(i) of the scale elements 173a-173d is varied by 1% along the positions (mm) over an absolute signal range of this example of the first scale track 102a. The detector signals output is characterized by upper signal peaks USP2 that fall along a slightly curved line and lower signal peaks LSP2 that similarly fall along a slightly curved line, with a peak-to-peak amplitude PP2 slightly varying over the absolute signal range along the first scale track 102a. A periodic detector signal due to the periodic pattern component of this example of the first scale track 102a mostly contributes to the peak-to-peak amplitude PP2, which includes a DC offset value DC2 that varies (decreases) along a slightly curved line over the absolute signal range along the first scale track 102a. In FIG. 3B, the peak-to-peak amplitude PP2 varies significantly less than the peak-to-peak amplitude PP1. However, the DC offset value DC2 varies in a slightly non-linear manner.

FIG. 3C shows detector signals output from the detector 164 comprising the signal sensing element 174, which is a conductor winding consisting of 7 turns, wherein the effective width dimension W(i) of the scale elements 173a-173d is varied by 0.25% along the positions (mm) over an absolute signal range of this example of the first scale track 102a. The detector signals output is characterized by upper signal peaks USP3 that fall along a substantially straight line and lower signal peaks LSP3 that similarly fall along a substantially straight line, with a peak-to-peak amplitude PP3 only slightly varying over the absolute signal range along the first scale track 102a. A periodic detector signal due to the periodic pattern component of this example of the first scale track 102a mostly contributes to the peak-to-peak amplitude PP3, which includes a DC offset value DC3 that varies (decreases) along a substantially straight line over the absolute signal range along the first scale track 102a.

It has been discovered that a configuration, in which the peak-to-peak amplitude PP is substantially constant while the DC offset value varies substantially linearly over an absolute signal range along the scale track, is highly robust against (less sensitive to) measurement errors due to an unintended gap (variation) between the detector 164 and the scale 102. More generally, both the DC offset value and peak-to-peak amplitude can vary greatly from one end of a scale track to the other. Careful sensor design can reduce peak-to-peak amplitude variation (e.g. as shown in FIG. 3B or FIG. 3C). Also, careful scale design can make DC variation highly linear (e.g. as shown FIG. 3C). It has been determined that small peak-to-peak amplitude variation and linear DC offset variation are desirable qualities for determining an accurate absolute position measurement. In various arrangements, a variation in the DC offset value may be at least as large as (and preferably at least 2 times as large as) a variation of the peak-to-peak amplitude of the periodic detector signal over the same position change along the scale track 102a.

Figure 4:
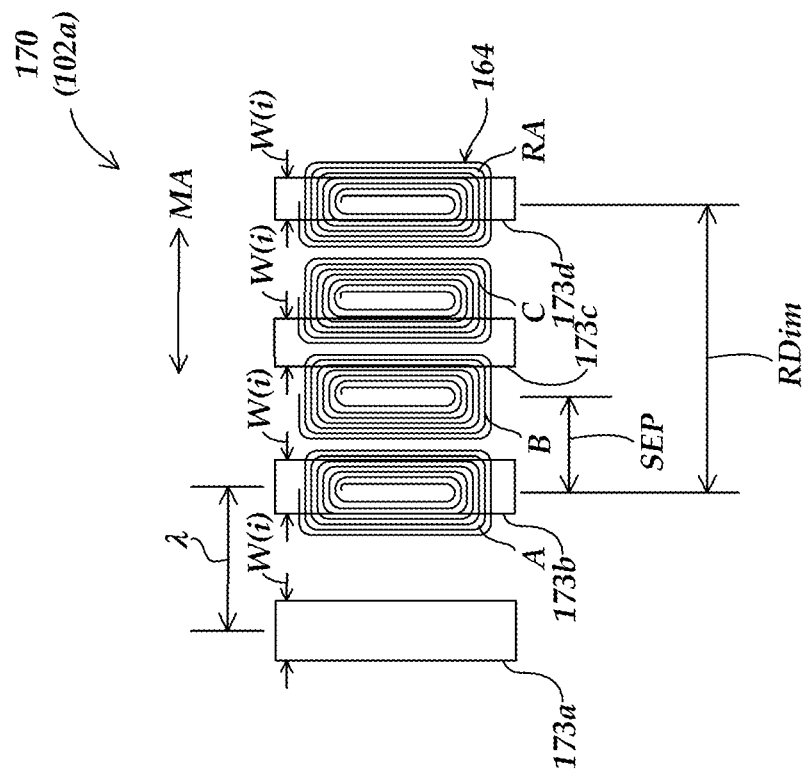
FIG. 4 is a top plan view of a portion of the scale including four scale elements, relative to which the detector comprising four sensing elements including one reference sensing element, which is specifically configured to provide a redundant spatial phase signal according to embodiments of the present invention, is positioned to produce detector signals including the redundant spatial phase signal.

FIG. 4 is a top plan view of a portion of the scale track 102a including a signal modulating scale pattern 170 comprising four scale elements 173a-173d. The signal modulating scale pattern 170 includes a periodic pattern component provided by the periodic arrangement of the four scale elements 173a-173d, and a gradual pattern variation component provided by a varying effective width dimension W(i) of the scale elements 173a-173d. For example, the configuration of the four scale elements 173a-173d may be similar to that which is used to produce the detector signals output of FIG. 3C, described above.

FIG. 4 also illustrates the detector 164 comprising four sensing elements A, B, C and RA configured to provide a set of detector signals, which respond to the signal modulating scale pattern 170 and which are indicative of a position of the detector 164 along the scale track 102a.

Figure 5:
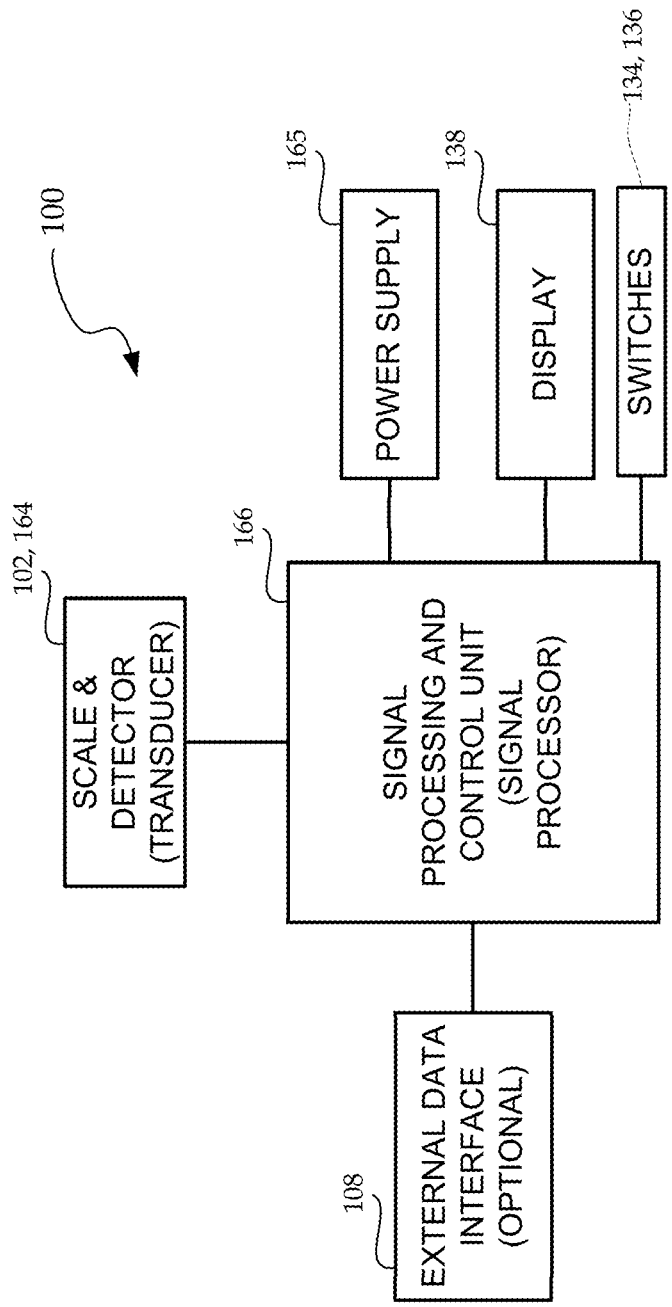
FIG. 5 is a block diagram of exemplary components of an electronic absolute position encoder according to an embodiment of the invention.

FIG. 5 is a block diagram of exemplary components of an electronic absolute position encoder according to an embodiment of the invention. The elements similarly disclosed in FIG. 1 that illustrates the caliper 100 incorporating the electronic absolute position encoder are identified with the same reference numbers as used in FIG. 1. The electronic absolute position encoder 100 includes the scale 102 and the detector 164, which together form a transducer. The electronic absolute position encoder 100 includes suitable user interface features such as the display 138 and the user-operable switches 134, 136. The electronic absolute position encoder may additionally include a power supply 165. All of these elements are coupled to a signal processor (or signal processing and control unit), which may be embodied as the signal processing and display electronic circuit (signal processor) 166. The signal processor 166 receives detector signals from the detector 164 and uses the received detector signals to determine an absolute position of the detector 164 along the scale track 102a.

Referring back to FIG. 4, the sensing elements include N (3 in this example) spatial phase sensing elements A, B and C, and a first reference sensing element RA. The spatial phase sensing elements are configured to provide N (3) respective signals and are located at their N (3) respective locations along the measuring axis (MA) direction on the detector 164. Each of the N locations corresponds to sensing a unique Nth spatial phase of the periodic pattern component, and a corresponding Nth position along the gradual pattern variation component.

In the example of FIG. 4, the spatial phase sensing elements A, B and C are respectively located, with an equal separation distance (SEP) therebetween, along the measuring axis MA direction of the detector 164. As shown in FIG. 4, the separation distance SEP is equal to $(2/3)*\lambda$. The spatial phase sensing elements A, B and C respectively sense spatial phases of 0, 240 and 120 degrees of the periodic pattern component, and corresponding first, second and third positions along the gradual pattern component.

Briefly, incremental position of the detector 164 relative to the signal modulating scale pattern 170 is determined by converting the detector signals into sign and cosine components at each position and then taking the arctangent. Absolute position is determined by taking an average of the detector signals which respectively give a unique absolute position value specific to each position. It will be appreciated that such position calculation formulas may be implemented by any combination of signal processing and physical circuit combinations (e.g., the absolute position signal, which is a sum (average) of multiple signals, may be determined from signal processing and/or a physical circuit combination of multiple signal lines).

Typically, for accurate determination of both incremental and absolute positions, a slope of a gradual signal variation exhibited by the detector signals needs to be known. For example, the slope is nominally designed to be a specific value and used to correct mismatch between spatial phases during incremental position determination or to determine a unique absolute position value specific to each position. The actual slope, however, may deviate from the nominally designed value due to manufacturing variability, dynamic variability, and environmental variability. While independent calibration of each encoder unit to determine its actual slope is possible, such would be cumbersome and costly. Various embodiments of the present invention permit easy determination of an actual slope of each encoder unit, in a manner transparent to the user.

Specifically, the signal modulating scale pattern 170 according to various embodiments includes at least one reference sensing element, which is particularly configured and located so as to produce a redundant spatial phase signal that can be used to calculate the scale factor (e.g., slope) for the gradual signal variation exhibited by the detector signals. In FIG. 4, the first reference sensing element RA is located at a first reference location on the detector 164 that is spaced apart along the measuring axis MA direction by a first reference distance (RDim) corresponding to an integer multiple of 360 degrees of spatial phase shift relative to the first spatial phase sensing element A, which provides a first signal corresponding to the first spatial phase (e.g., 0 degrees) of the periodic pattern component, and a first position along the gradual pattern variation component.

The first reference sensing element RA is configured to provide a first reference signal corresponding to the first spatial phase (e.g., 0 degrees) of the periodic pattern component, and a corresponding first reference position along the gradual pattern variation component. It should be noted that, because the first signal and the first reference signal include nominally similar signal contributions from the periodic pattern component, a difference between the first signal and the first reference signal is due to a difference in their signal contributions from the gradual pattern variation component.

The first signal and the first reference signal are not statically connected to one another and contribute to independent input signals for the signal processor 166. The difference between the first signal and the first reference signal due to the first reference distance RDim is a first signal difference indicative of a scale factor M1 for a first gradual signal variation exhibited by the detector signals, wherein the first gradual signal variation is due to the gradual pattern variation component as a function of the position of the detector 164 along the scale track 102a. The first signal difference may be determined by the signal processor 166, or with differential amplifiers working directly on the outputs of the first spatial phase sensing element A and the first reference sensing element RA. The scale factor M1 derived in this manner may then be used to directly provide the slope of the gradual signal variation of the detector signals respectively provided by the set of sensing elements A, B, C and RA. The electronic absolute position encoder configured in this manner is thus capable of determining the slope at each measurement. As such, it does not require a priori knowledge of the slope, nor costly calibration procedures to separately determine the slope for each encoder unit.

Still referring to FIG. 4, the periodic pattern component of the signal modulating scale pattern 170 is arranged according to the spatial wavelength L=λ, that is, the scale elements 173a-173d that form the periodic pattern component are arranged according to the spatial wavelength L=λ. The sensing elements A, B, C and RA in the illustrated embodiment are substantially identical to one another and each comprises a conductive winding including a plurality of approximately planar turns. The inductance or inductive coupling of the conductive winding is responsive to its position relative to the periodic pattern component of the signal modulating scale pattern 170. In various embodiments, the maximum dimension of the conductive winding along the measuring axis (MA) direction is at most 1.4 L and at least 0.6 L.

The scale factor M1 is proportional to a slope of the spatially-dependent DC offset, i.e. it is equal to the slope times the spatial wavelength λ times a number of spatial wavelengths λ between the first spatial phase sensing element A and the first reference sensing element RA. The DC offset variation may be expressed as DC(x) which is a linear function of a position x along the measuring axis MA according to the relation:

$$DC(x)=mx+b$$

where m is the slope determined by the scale factor M1, and b is an arbitrary, but constant value.

In various exemplary embodiments, the conductive winding comprises at least 6 and at most 11 approximately planar turns. In further exemplary embodiments, the conductive winding comprises at least 7 and at most 10 approximately planar turns. For example, at least some of the approximately planar turns may be formed by a narrow conductor formed in a spiral configuration on a single layer of a printed circuit board.

The signal processor 166 is configured to determine the absolute position of the detector 164 along the first scale track 102a to a first resolution smaller than the spatial wavelength L=λ of the periodic pattern component, based on a first value of a relationship between the set of detector signals that exhibit the first gradual signal variation and the scale factor M1 for the first gradual signal variation. That is, the absolute position determination to the first resolution identifies one spatial wavelength (λ), out of multiple spatial wavelengths that form the periodic pattern component, as possibly containing the absolute position of the detector 164. The signal processor 166 is further configured to determine the absolute position of the detector 164 along the first scale track 102a to a second resolution smaller than the first resolution, based on a second value of a relationship between (among) the detector signals. The second value of a relationship indicates a spatial phase position of the detector 164 within the one (current) spatial wavelength (λ), which has been identified by the first resolution absolute position determination as described above.

Figure 6:
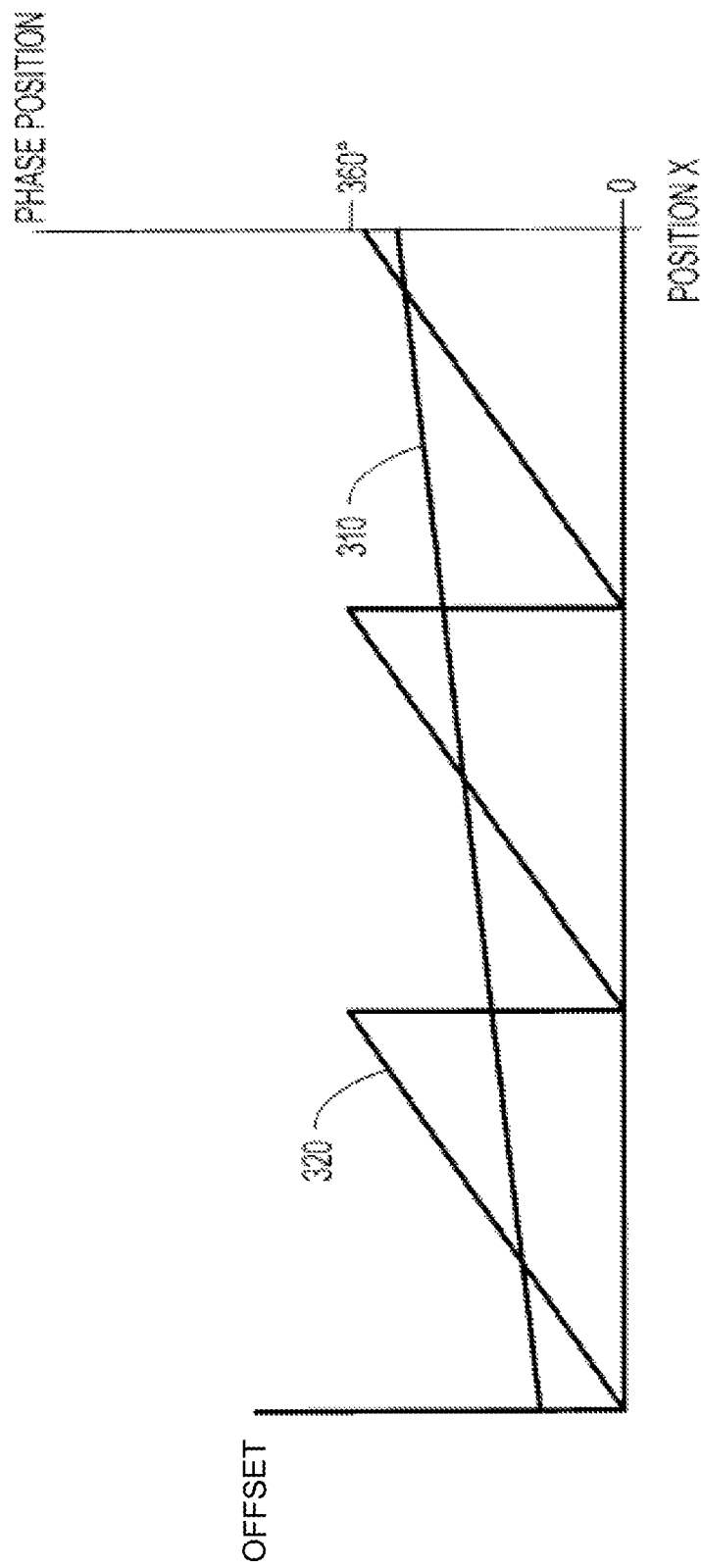
FIG. 6 is a graph schematically representing the spatially-dependent DC offset and spatially-dependent phase position of output signals from the sensing elements of a detector (read head) as a function of position on the scale, according to an embodiment of the invention.

FIG. 6 is a graph that illustrates the concept of determining an absolute position, first to the first resolution (to find one spatial wavelength), and then to the second resolution (to find the absolute position within said one spatial wavelength). FIG. 6 shows the spatially-dependent DC offset (left vertical axis) and spatially-dependent phase position (right vertical axis) of detector signals output from the detector 164 as a function of position (horizontal axis). The signal processor 166 according to various embodiments may use a DC offset position measurement, represented by line 310 having a slope, to select one spatial wavelength, out of multiple spatial wavelengths, as possibly containing the absolute value. The signal processor 166 may then use a phase position measurement, represented by line 320, to identify a specific phase position within the selected one spatial wavelength to thereby determine the absolute position within the selected one spatial wavelength. As apparent from line 320, the phase position is position dependent only within one spatial wavelength, i.e., the second resolution absolute position determination may be used only within one spatial wavelength that is identified by the first resolution absolute position determination.

Figure 7:
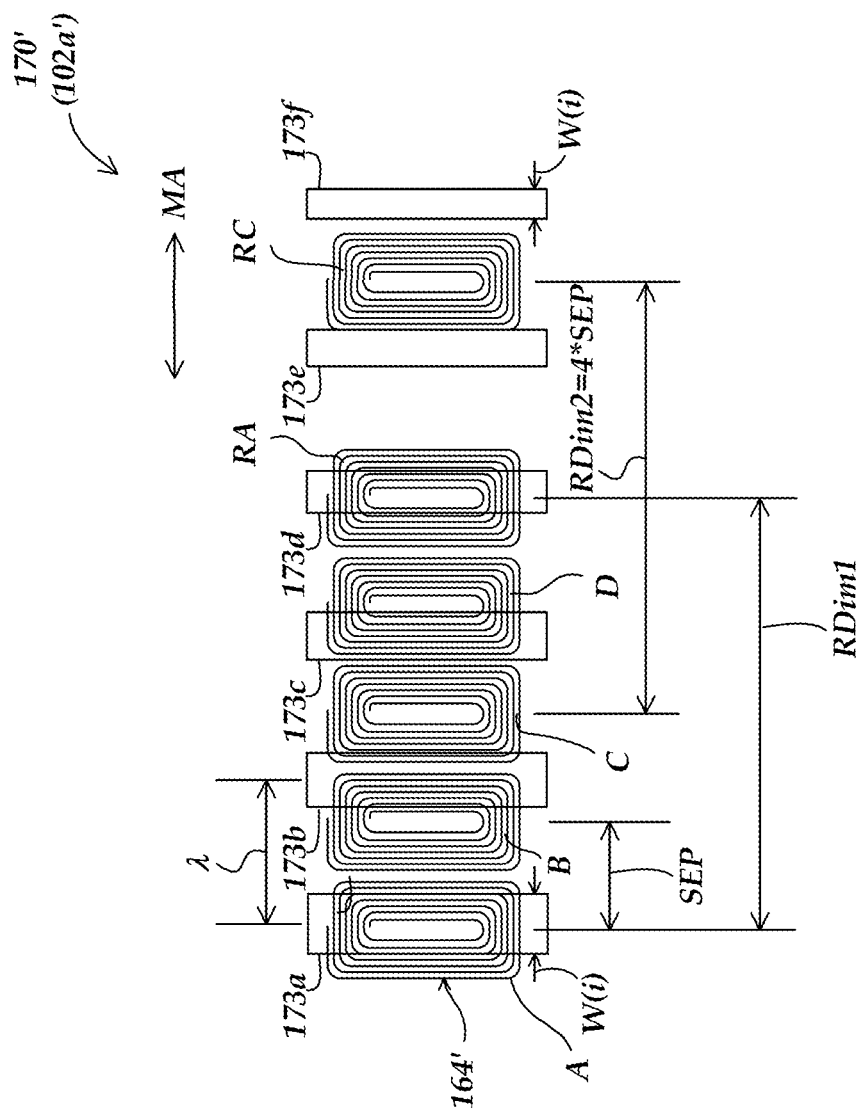
FIG. 7 is a top plan view of a portion of the scale including six scale elements, relative to which the detector comprising six sensing elements including two reference sensing elements, respectively configured to provide two redundant spatial phase signals according to embodiments of the present invention, is positioned to produce detector signals including the two redundant spatial phase signals.

FIG. 7 is a top plan view of a portion of a scale track 102a' including a signal modulating scale pattern 170' comprising six scale elements 173a-173f. The signal modulating scale pattern 170' includes a periodic pattern component provided by the periodic arrangement of the six scale elements 173a-173f, and a gradual pattern variation component provided by the varying effective width dimension W(i) of the scale elements 173a-173f. FIG. 7 also illustrates the detector 164' comprising six sensing elements A, B, C, D, RA and RC configured to provide a set of detector signals, which respond to the signal modulating scale pattern 170' and which are indicative of a position of the detector 164' along the scale track 102a'.

The sensing elements include N (4 in this example) spatial phase sensing elements A, B, C and D, a first reference sensing element RA, and a second reference sensing element RC. The spatial phase sensing elements are configured to provide N (4) respective signals and are located at their N (4) respective locations along the measuring axis (MA) direction on the detector 164'. Each of the N locations corresponds to sensing a unique Nth spatial phase of the periodic pattern component, and a corresponding Nth position along the gradual pattern variation component.

In the example of FIG. 7, the spatial phase sensing elements A, B, C and D are respectively located, with an equal separation distance (SEP) therebetween, along the measuring axis MA direction of the detector 164' to respectively sense spatial phases of 0, 270, 180 and 90 degrees of the periodic pattern component, and a corresponding first (0), second (270), third (180) and fourth (90) position along the gradual pattern component. As shown in FIG. 7, the separation distance SEP is equal to $(3/4)*\lambda$.

The first reference sensing element RA is located at a first reference location on the detector 164' that is spaced apart along the measuring axis MA direction by a first reference distance (RDim1) corresponding to an integer multiple of 360 degrees of spatial phase shift relative to the first spatial phase sensing element A, which provides a first signal corresponding to the first spatial phase (e.g., 0 degrees) of the periodic pattern component, and a first position along the gradual pattern variation component. The first reference sensing element RA is configured to provide a first reference signal corresponding to the first spatial phase (e.g., 0 degrees) of the periodic pattern component, and a corresponding first reference position along the gradual pattern variation component, such that the first signal and the first reference signal include nominally similar signal contributions from the periodic pattern component and a difference between the first signal and the first reference signal is due to a difference in their signal contributions from the gradual pattern variation component.

The first signal and the first reference signal are not statically connected to one another and contribute to independent input signals for the signal processor 166. The difference between the first signal and the first reference signal due to the first reference distance RDim1 is a first signal difference indicative of a scale factor M1 for a gradual signal variation exhibited by the detector signals, wherein the gradual signal variation is due to the gradual pattern variation component as a function of the position of the detector 164' along the scale track 102a'.

The second reference sensing element RC is located at a second reference location on the detector 164' that is spaced apart along the measuring axis MA direction by a second reference distance (RDim2) corresponding to an integer multiple of 360 degrees of spatial phase shift relative to the second spatial phase sensing element C, which provides a second signal corresponding to the second spatial phase (e.g., 180 degrees) of the periodic pattern component, and a second position along the gradual pattern variation component. As shown in FIG. 7, RDim2 is equal to 4*SEP. The second reference sensing element RC is configured to provide a second reference signal corresponding to the second spatial phase (e.g., 180 degrees) of the periodic pattern component, and a corresponding second reference position along the gradual pattern variation component, such that the second signal and the second reference signal include nominally similar signal contributions from the periodic pattern component and a difference between the second signal and the second reference signal is due to a difference in their signal contributions from the gradual pattern variation component.

The second signal and the second reference signal are not statically connected to one another and contribute to independent input signals for the signal processor 166. The difference between the second signal and the second reference signal due to the second reference distance RDim2 is a second signal difference indicative of the scale factor M1 for the gradual signal variation exhibited by the detector signals as a function of the position of the detector 164' along the scale track 102a'.

The scale factor M1 for the gradual signal variation may be determined based, at least partially, on a combination of the first and second signal differences derived based on the first and second reference sensing elements RA and RC, respectively.

In this embodiment, the detector 164' includes six sensing elements including two reference sensing elements RA and RC, respectively configured to provide two redundant spatial phase signals used to derive the first and second differences, which may be combined (e.g., averaged) to derive the scale factor M1 for the gradual signal variation.

For example, the first difference potentially has a spatially periodic difference error having a spatial phase E1 (0 phase) as a function of the position of the detector 164', and the second difference potentially has a similar spatially periodic difference error having a spatial phase E2 (180 phase). Thus, summing or averaging the first and second differences tends to nullify or suppress a potential spatially periodic error component in the resulting scale factor M1 (e.g. errors resulting from peak-to-peak amplitude variation as shown in FIG. 3A).

Figure 8:
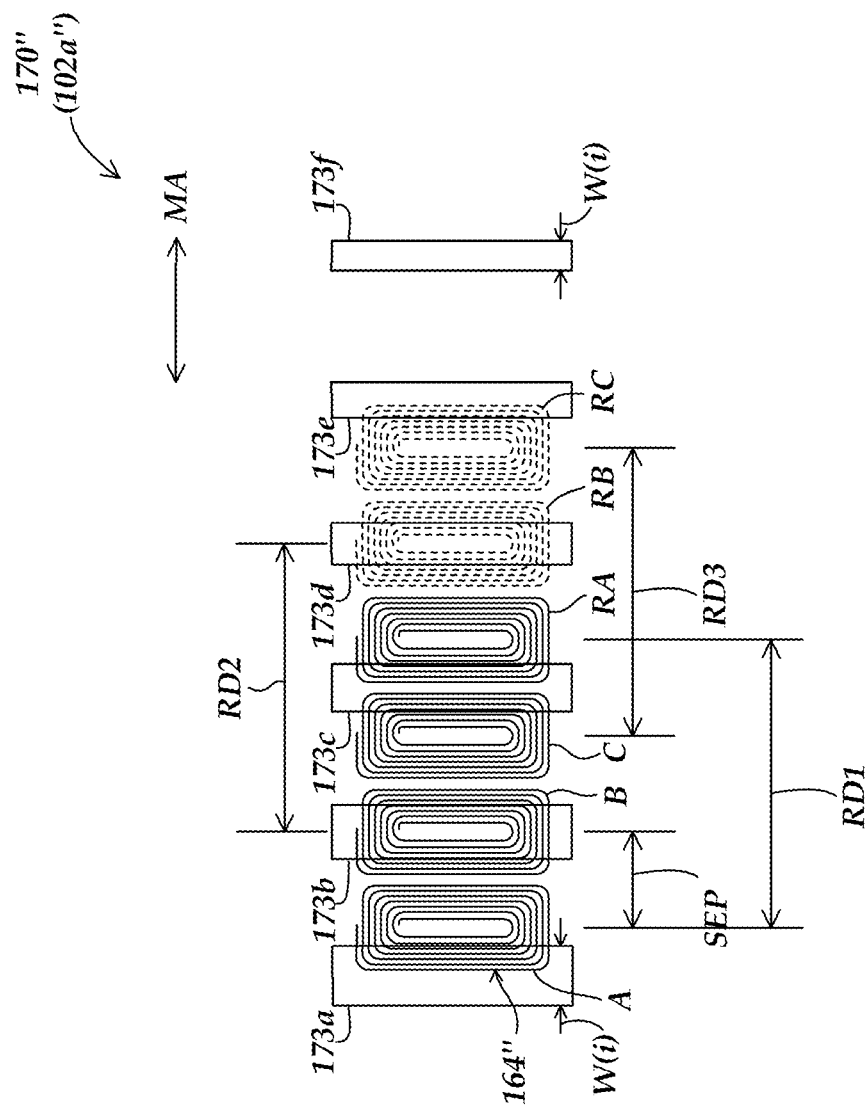
FIG. 8 is a top plan view of a portion of the scale including six scale elements, relative to which the detector comprising six sensing elements including three reference sensing elements, respectively configured to provide three redundant spatial phase signals according to embodiments of the present invention, is positioned to produce detector signals including the three redundant spatial phase signals.

FIG. 8 is a top plan view of a portion of a scale track 102a" including a signal modulating scale pattern 170" comprising six scale elements 173a-173f. The signal modulating scale pattern 170" includes a periodic pattern component provided by the periodic arrangement of the six scale elements 173a-173f, and a gradual pattern variation component provided by the varying effective width dimension W(i) of the scale elements 173a-173f. FIG. 8 also illustrates the detector 164" comprising six sensing elements A, B, C, RA, RB and RC configured to provide a set of detector signals, which respond to the signal modulating scale pattern 170" and which are indicative of a position of the detector 164" along the scale track 102a'''.

The sensing elements include N (3 in this example) spatial phase sensing elements A, B and C, a first reference sensing element RA, a second reference sensing element RB, and a third reference sensing element RC. The spatial phase sensing elements are configured to provide N (3) respective signals and are located at their N (3) respective locations along the measuring axis (MA) direction on the detector 164". Each of the N locations corresponds to sensing a unique Nth spatial phase of the periodic pattern component, and a corresponding Nth position along the gradual pattern variation component.

In the example of FIG. 8, the spatial phase sensing elements A, B and C are respectively located, with an equal separation distance (SEP) therebetween, along the measuring axis MA direction of the detector 164" to respectively sense spatial phases of 0, 240 and 120 degrees of the periodic pattern component, and a corresponding first, second and third position along the gradual pattern component. As shown in FIG. 8, the separation distance SEP is equal to $(2/3)*\lambda$.

The first reference sensing element RA is located at a first reference location on the detector 164" that is spaced apart along the measuring axis MA direction by a first reference distance (RD1) corresponding to an integer multiple of 360 degrees of spatial phase shift relative to the first spatial phase sensing element A, which provides a first signal corresponding to the first spatial phase (e.g., 0 degrees) of the periodic pattern component, and a first position along the gradual pattern variation component. The first reference sensing element RA is configured to provide a first reference signal corresponding to the first spatial phase (e.g., 0 degrees) of the periodic pattern component, and a corresponding first reference position along the gradual pattern variation component, such that the first signal and the first reference signal include nominally similar signal contributions from the periodic pattern component and a difference between the first signal and the first reference signal is due to a difference in their signal contributions from the gradual pattern variation component.

The first signal and the first reference signal are not statically connected to one another and contribute to independent input signals for the signal processor 166. The difference between the first signal and the first reference signal due to the first reference distance RD1 is a first signal difference indicative of a scale factor M1 for a gradual signal variation exhibited by the detector signals, wherein the gradual signal variation is due to the gradual pattern variation component as a function of the position of the detector 164" along the scale track 102a'''.

The second reference sensing element RB is located at a second reference location on the detector 164" that is spaced apart along the measuring axis MA direction by a second reference distance (RD2) corresponding to an integer multiple of 360 degrees of spatial phase shift relative to the second spatial phase sensing element B, which provides a second signal corresponding to the second spatial phase (e.g., 240 degrees) of the periodic pattern component and a second position along the gradual pattern variation component. The second reference sensing element RB is configured to provide a second reference signal corresponding to the second spatial phase (e.g., 240 degrees) of the periodic pattern component and a corresponding first reference position along the gradual pattern variation component, such that the second signal and the second reference signal include nominally similar signal contributions from the periodic pattern component and a difference between the second signal and the second reference signal is due to a difference in their signal contributions from the gradual pattern variation component.

The second signal and the second reference signal are not statically connected to one another and contribute to independent input signals for the signal processor 166. The difference between the second signal and the second reference signal due to the second reference distance RD2 is a second signal difference indicative of the scale factor M1 for the gradual signal variation exhibited by the detector signals as a function of the position of the detector 164" along the scale track 102a'''.

The third reference sensing element RC is located at a third reference location on the detector 164" that is spaced apart along the measuring axis MA direction by a third reference distance (RD3) corresponding to an integer multiple of 360 degrees of spatial phase shift relative to the third spatial phase sensing element C, which provides a third signal corresponding to the third spatial phase (e.g., 120 degrees) of the periodic pattern component and a third position along the gradual pattern variation component. The third reference sensing element RC is configured to provide a third reference signal corresponding to the third spatial phase (e.g., 120 degrees) of the periodic pattern component and a corresponding third reference position along the gradual pattern variation component, such that the third signal and the third reference signal include nominally similar signal contributions from the periodic pattern component and a difference between the third signal and the third reference signal is due to a difference in their signal contributions from the gradual pattern variation component.

The third signal and the third reference signal are not statically connected to one another and contribute to independent input signals for the signal processor 166. The difference between the third signal and the third reference signal due to the third reference distance RD3 is a third signal difference indicative of the scale factor M1 for the gradual signal variation exhibited by the detector signals as a function of the position of the detector 164" along the scale track 102a'''.

The scale factor M1 for the gradual signal variation may be determined based, at least partially, on a combination of the first, second and third signal differences derived based on the first, second and third reference sensing elements RA, RB and RC, respectively.

In this embodiment, the detector 164" includes six sensing elements including three reference sensing elements RA, RB and RC, respectively configured to provide three redundant spatial phase signals used to derive the first, second and third differences, which may be combined (e.g., averaged) to derive the scale factor M1 for the gradual signal variation.

For example, the first difference potentially has a spatially periodic difference error having a spatial phase E1 (0 phase) as a function of the position of the detector 164", the second difference potentially has a similar spatially periodic difference error having a spatial phase E2 (240 phase), and the third difference potentially has a similar spatially periodic difference error having a spatial phase E3 (120 phase). Thus, summing or averaging the first, second and third differences tends to nullify or suppress a potential spatially periodic error component in the resulting scale factor M1 (e.g. errors resulting from peak-to-peak amplitude variation as shown in FIG. 3A).

Figure 9:
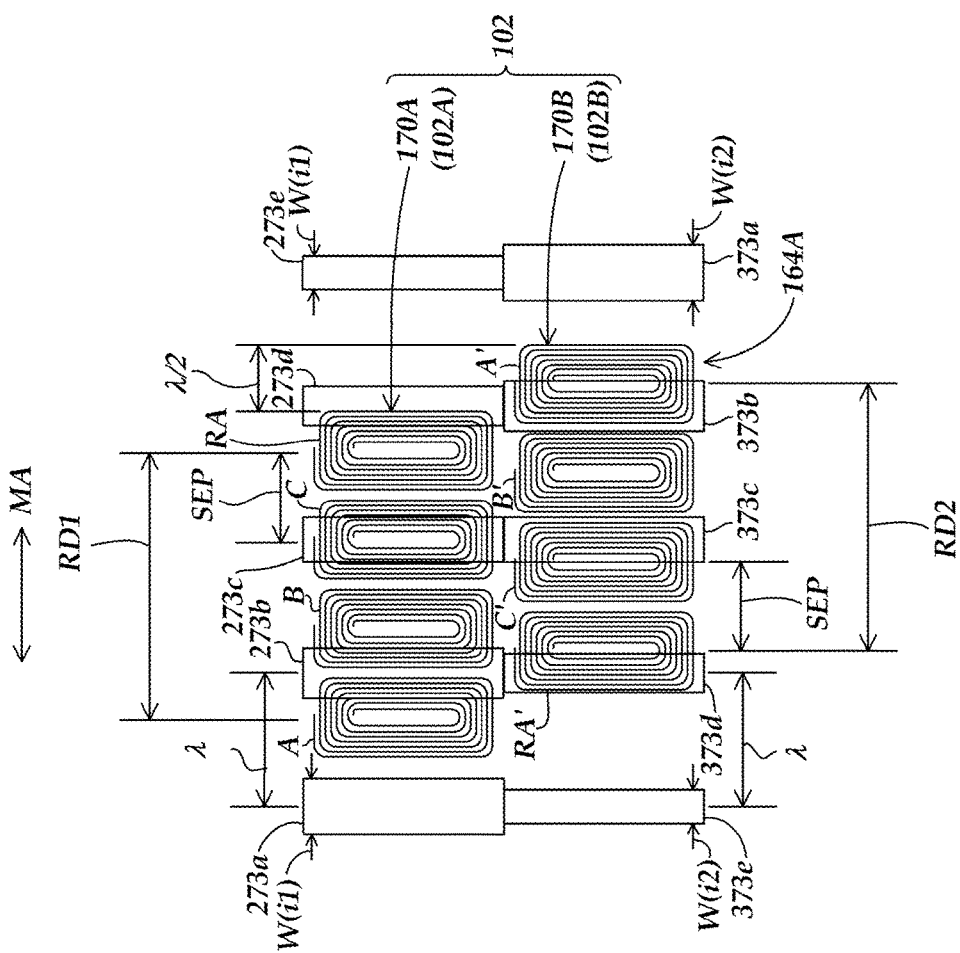
FIG. 9 is a top plan view of a portion of the scale including a first scale track and a second scale track, relative to which the detector including a first set of sensing elements and a second set of sensing elements according to embodiments of the present invention is positioned to produce a first set of detector signals and a second set of detector signals, respectively.

FIG. 9 is a top plan view of a portion of the scale 102 including a first scale track 102A and a second scale track 102B, relative to which the detector 164A including a first set of sensing elements (A, B, C, RA) and a second set of sensing elements (A', B', C', RA') is positioned to produce a first set of detector signals and a second set of detector signals, respectively.

The first scale track 102A extends along the measuring axis (MA) direction and includes a first signal modulating scale pattern 170A comprising a periodic pattern component provided by the periodic arrangement of five scale elements 273a-273e, and a gradual pattern variation component provided by the varying effective width dimension W(i1) of the scale elements 273a-273e as a function of the position along the first scale track 102A. The second scale track 102B extends along the measuring axis (MA) direction and includes a second signal modulating scale pattern 170B comprising a periodic pattern component provided by the periodic arrangement of five scale elements 373a-373e, and a gradual pattern variation component provided by the varying effective width dimension W(i2) of the scale elements 373a-373e as a function of position along the second scale track 102B.

The detector 164A includes the first set of sensing elements A, B, C, RA, located with an equal separation distance (SEP) therebetween and aligned along the first scale track 102A, which are configured to provide a first set of detector signals which respond to the first signal modulating scale pattern 170A and which are indicative of a position of the detector 164A along the first scale track 102A. The detector 164A further includes the second set of sensing elements A', B', C', RA', located with an equal separation distance (SEP) therebetween and aligned along the second scale track 102B, which are configured to provide a second set of detector signals which respond to the second signal modulating scale pattern 170B and which are indicative of a position of the detector 164A along the second scale track 102B. As shown in FIG. 9, the separation distance SEP is equal to $(2/3)*\lambda$.

The signal processor 166 is configured to determine an absolute position of the detector 164A along the scale 102 based on the first and second sets of detector signals provided by the first and second sets of sensing elements. The first set of sensing elements include N (e.g., 3) spatial phase sensing elements A, B and C, and additionally at least a first reference sensing element RA. The second set of sensing elements include K (e.g., 3) spatial phase sensing elements A', B' and C', and additionally at least a primary reference sensing element RA'.

The first set of sensing elements A, B, C and RA are configured and arranged similarly to the sensing elements A, B, C and RA illustrated in FIG. 4 above.

Of the second set of sensing elements, K (3) spatial phase sensing elements A', B' and C' are configured to provide K respective signals and are located at their K respective locations (e.g., 0, 240 and 120 phase-shift locations) along the measuring axis (MA) direction on the detector 164A. Each of the K locations corresponds to sensing a unique Kth spatial phase of the periodic pattern component, and a corresponding Kth position along the gradual pattern variation component.

The primary reference sensing element RA' is located at a primary reference location on the detector 164A that is spaced apart along the measuring axis (MA) direction by a primary reference distance (RD2) corresponding to an integer multiple of 360 degrees of spatial phase shift relative to the primary spatial phase sensing element A' of the K spatial phase sensing elements, which provides a primary signal corresponding to a primary spatial phase of the periodic pattern component and a primary position along the gradual pattern variation component.

The primary reference sensing element RA' is configured to provide a primary reference signal corresponding to the primary spatial phase of the periodic pattern component, and a corresponding primary reference position along the gradual pattern variation component such that the primary signal and the primary reference signal include nominally similar signal contributions from the periodic pattern component of the second scale track 102B and a difference between the primary signal and the primary reference signal is due to a difference in their signal contributions from the gradual pattern variation component of the second scale track 102B.

The primary signal and the primary reference signal are not statically connected to one another and contribute to independent input signals for the signal processor 166, and the difference between the primary signal and the primary reference signal due to the primary reference distance RD2 is a primary signal difference indicative of a scale factor M2 for a second gradual signal variation exhibited by the second set of detector signals, wherein the second gradual signal variation is due to the gradual pattern variation component as a function of the position of the detector 164A along the second scale track 102B.

In accordance with various embodiments, the scale factor M2 for the second gradual signal variation exhibited by the second set of detector signals is approximately equal to the negative of the scale factor M1 for the first gradual signal variation exhibited by the first set of detector signals. This may be accomplished, for example, by setting K=N and making the first and second sets of sensing elements similar to one another, and further making the gradual pattern variation component of the first signal modulating scale pattern 170A and the gradual pattern variation component of the second signal modulating scale pattern 170B similar to one another but reversed in polarity along the measuring axis (MA) direction. In the illustrated example of FIG. 9, the gradual pattern variation components of the two signal modulating scale patterns 170A and 170B are reversed in polarity, in that the effective width dimension W(i1) of the first set of scale elements 273a-273e is decreased from left to right while the effective width dimension W(i2) of the second set of scale elements 373e-373a is decreased, in the opposite direction, from right to left.

The periodic pattern component of each of the first and second signal modulating scale patterns 170A and 170B is arranged according to a spatial wavelength $L=\lambda$. In accordance with further embodiments, the first set of sensing elements (A, B, C, RA) are staggered from the second set of sensing elements (A', B', C', RA') along the measuring axis (MA) direction by a distance which is equal to one half of the spatial wavelength $L=\lambda$, i.e., by $\lambda/2$.

The signal processor 166 is configured to determine the absolute position of the detector 164A along the scale 102 to a first resolution smaller than the spatial wavelength $L=\lambda$, based on a third value of a relationship between a third set of detector signals, which exhibit a third gradual variation that depends on the first and second gradual signal variations, and a scale factor M3 for the third gradual signal variation that is determined based, at least partially, on the first signal difference and the primary signal difference. For example, the scale factor M3 may be derived by combining (e.g., averaging) the first signal difference and the primary signal difference, and may be used to select one spatial wavelength, out of multiple spatial wavelengths that form the periodic pattern component of either or both of the first and second signal modulating scale patterns 170A and 170B, as possibly containing the absolute position of the detector 164A.

The signal processor 166 is further configured to determine the absolute position of the detector 164A to a second resolution smaller than the first resolution, based on a fourth value of a relationship between (among) the corresponding detector signals. The fourth value of a relationship indicates a spatial phase position of the detector 164A within a current spatial wavelength of the periodic pattern component of at least one of the first and second signal modulating scale patterns 170A and 170B, which has been identified by the first resolution absolute position determination as described above. As described above in reference to FIG. 6, the signal processor 166 can thus determine an absolute position, first to the first resolution (to find one spatial wavelength), and then to the second resolution (to find the absolute position within said one spatial wavelength).

Various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electronic absolute position encoder, the electronic absolute position encoder comprising:
    a scale comprising a first scale track extending along a measuring axis direction and including a first signal modulating scale pattern comprising a periodic pattern component comprising at least one of a periodic area modulation or a periodic material characteristic modulation as a function of position along the first scale track, and a gradual pattern variation component combined with or superimposed on the periodic pattern component and comprising at least one of a gradual area variation or a gradual material characteristic variation as a function of position over a first range along the first scale track;
    a detector comprising at least a first set of sensing elements aligned along the first scale track, the first set of sensing elements configured to provide a first set of detector signals which respond to the first signal modulating scale pattern and which are indicative of a position of the detector along the first scale track; and
    a signal processor configured to determine an absolute position of the detector along the scale based on detector signals provided by the detector,
    wherein:
    the first set of sensing elements comprises N spatial phase sensing elements and additionally at least a first reference sensing element, wherein:
        the N spatial phase sensing elements are configured to provide N respective signals and are at their N respective locations along the measuring axis direction on the detector, with each of the N locations corresponding to sensing a unique Nth spatial phase of the periodic pattern component and a corresponding Nth position along the gradual pattern variation component;
        the first reference sensing element is located at a first reference location on the detector that is spaced apart along the measuring axis direction by a first reference distance corresponding to an integer multiple of 360 degrees of spatial phase shift relative to a first spatial phase sensing element of the N spatial phase sensing elements which provides a first signal corresponding to a first spatial phase of the periodic pattern component and a first position along the gradual pattern variation component;
        the first reference sensing element is configured to provide a first reference signal corresponding to the first spatial phase of the periodic pattern component and a corresponding first reference position along the gradual pattern variation component such that the first signal and the first reference signal include nominally similar signal contributions from the periodic pattern component and a difference between the first signal and the first reference signal is due to a difference in their signal contributions from the gradual pattern variation component; and
        the first signal and the first reference signal are not statically connected to one another and contribute to independent input signals for the signal processor, and the difference between the first signal and the first reference signal due to the first reference distance is a first signal difference indicative of a scale factor M1 for a first gradual signal variation exhibited by the first set of detector signals, wherein the first gradual signal variation is due to the gradual pattern variation component as a function of the position of the detector along the first scale track.

2. The electronic absolute position encoder of claim 1, wherein the first gradual signal variation due to the gradual pattern variation component comprises a gradual variation in a DC offset value of a periodic detector signal due the periodic pattern component.

3. The electronic absolute position encoder of claim 2, wherein the first scale track and the first set of sensing elements are configured such that the gradual variation in the DC offset value is at least as large as a variation of a peak-to-peak amplitude of the periodic detector signal over the same position change along the first scale track.

4. The electronic absolute position encoder of claim 3, wherein:
    the periodic pattern component is arranged according to a spatial wavelength L;
    the sensing elements are substantially identical to one another and each comprises a conductive winding comprising a plurality of approximately planar turns, wherein the inductance or inductive coupling of the conductive winding is responsive to its position relative to the periodic pattern component; and
    a maximum dimension of the conductive winding along the measuring axis direction is at most 1.4 L and at least 0.6 L.

5. The electronic absolute position encoder of claim 4, wherein the conductive winding comprises at least 6 and at most 11 approximately planar turns.

6. The electronic absolute position encoder of claim 5, wherein the conductive winding comprises at least 7 and at most 10 approximately planar turns.

7. The electronic absolute position encoder of claim 5, wherein at least some of the approximately planar turns are formed by a narrow conductor formed in a spiral configuration on a single layer of a printed circuit board.

8. The electronic position encoder of claim 4, wherein the gradual pattern variation component comprises the gradual area variation in an effective width dimension W along the measuring axis direction of scale elements that form the periodic pattern component that is arranged according to the spatial wavelength L.

9. The electronic absolute position encoder of claim 8, wherein the gradual area variation in the effective width dimension W is configured such that W varies between adjacent scale elements by at most 5%.

10. The electronic absolute position encoder of claim 9, wherein W varies between adjacent scale elements by at most 2%.

11. The electronic absolute position encoder of claim 3, wherein the gradual variation in the DC offset value is at least 2 times as large as the variation of the peak-to-peak amplitude of the periodic detector signal over the same position change along the first scale track.

12. The electronic absolute position encoder of claim 1, wherein:
the signal processor is configured to determine the absolute position of the detector along the scale to a first resolution smaller than a spatial wavelength L of the periodic pattern component, based on a first value of a relationship between the first set of detector signals that exhibit the first gradual signal variation and the scale factor M1 for the first gradual signal variation; and
the signal processor is further configured to determine the absolute position of the detector along the scale to a second resolution smaller than the first resolution, based on a second value of a relationship between the detector signals, wherein the second value of a relationship indicates a spatial phase position of the detector within a current spatial wavelength of the periodic pattern component indicated by the first resolution absolute position.

13. The electronic absolute position encoder of claim 12, wherein:
the N spatial phase sensing elements comprise a second spatial phase sensing element which provides a second signal corresponding to a second spatial phase of the periodic pattern component and a second position along the gradual pattern variation component, and a third spatial phase sensing element which provides a third signal corresponding to a third spatial phase of the periodic pattern component and a third position along the gradual pattern variation component;
ignoring integer multiples of 360 degrees of spatial phase shift, the second spatial phase differs from the first spatial phase by 120 degrees, and the third spatial phase shift differs from the first spatial phase shift by 240 degrees;
the at least first reference sensing element further comprises second and third reference sensing elements, wherein:
the second reference sensing element is located at a second reference location on the detector that is spaced apart along the measuring axis direction by a second reference distance corresponding to an integer multiple of 360 degrees of spatial phase shift relative to the second spatial phase sensing element, and the second reference sensing element is configured to provide a second reference signal corresponding to the second spatial phase of the periodic pattern component and a corresponding second reference position along the gradual pattern variation component such that the second signal and the second reference signal include nominally similar signal contributions from the periodic pattern component and a difference between the second signal and the second reference signal is due to a difference in their signal contributions from the gradual pattern variation component, and the second signal and the second reference signal are not statically connected to one another and contribute to independent input signals for the signal processor, and the difference between the second signal and the second reference signal due to the second reference distance is a second signal difference indicative of the scale factor M1 for the first gradual signal variation due to the gradual pattern variation component as a function of the position of the detector along the first scale track;
the third reference sensing element is located at a third reference location on the detector that is spaced apart along the measuring axis direction by a third reference distance corresponding to an integer multiple of 360 degrees of spatial phase shift relative to the third spatial phase sensing element, and the third reference sensing element is configured to provide a third reference signal corresponding to the third spatial phase of the periodic pattern component and a corresponding third reference position along the gradual pattern variation component such that the third signal and the third reference signal include nominally similar signal contributions from the periodic pattern component and a difference between the third signal and the third reference signal is due to a difference in their signal contributions from the gradual pattern variation component, and the third signal and the third reference signal are not statically connected to one another and contribute to independent input signals for the signal processor, and the difference between the third signal and the third reference signal due to the third reference distance is a third signal difference indicative of the scale factor M1 for the first gradual signal variation due to the gradual pattern variation component as a function of the position of the detector along the first scale track; and
the scale factor M1 for the first gradual signal variation is determined based, at least partially, on a combination of all of the first, second and third signal differences.

14. The electronic absolute position encoder of claim 12, wherein:
the N spatial phase sensing elements comprise a second spatial phase sensing element which provides a second signal corresponding to a second spatial phase of the periodic pattern component and a second position along the gradual pattern variation component, a third spatial phase sensing element which provides a third signal corresponding to a third spatial phase of the periodic pattern component and a third position along the gradual pattern variation component, and a fourth spatial phase sensing element which provides a fourth signal corresponding to a fourth spatial phase of the periodic pattern component and a fourth position along the gradual pattern variation component;
ignoring integer multiples of 360 degrees of spatial phase shift, the second spatial phase differs from the first spatial phase by 180 degrees, the third spatial phase shift differs from the first spatial phase shift by 90 degrees, and the fourth spatial phase shift differs from the first spatial phase shift by 270 degrees;

the at least first reference sensing element further comprises a second reference sensing element, wherein:

the second reference sensing element is located at a second reference location on the detector that is spaced apart along the measuring axis direction by a second reference distance corresponding to an integer multiple of 360 degrees of spatial phase shift relative to the second spatial phase sensing element, and the second reference sensing element is configured to provide a second reference signal corresponding to the second spatial phase of the periodic pattern component and a corresponding second reference position along the gradual pattern variation component such that the second signal and the second reference signal include nominally similar signal contributions from the periodic pattern component and a difference between the second signal and the second reference signal is due to a difference in their signal contributions from the gradual pattern variation component, and the second signal and the second reference signal are not statically connected to one another and contribute to independent input signals for the signal processor, and the difference between the second signal and the second reference signal due to the second reference distance is a second signal difference indicative of the scale factor M1 for the first gradual signal variation due to the gradual pattern variation component as a function of the position of the detector along the first scale track; and the scale factor M1 for the first gradual signal variation is determined based, at least partially, on a combination of the first and second signal differences.

15. The electronic absolute position encoder of claim 1, wherein:

the scale further comprises a second scale track extending along the measuring axis direction and including a second signal modulating scale pattern comprising a periodic pattern component comprising at least one of a periodic area modulation or a periodic material characteristic modulation as a function of position along the second scale track and a gradual pattern variation component combined with or superimposed on the periodic pattern component and comprising at least one of a gradual area variation or a gradual material characteristic variation as a function of position over a second range along the second scale track;

the detector further comprises a second set of sensing elements aligned along the second scale track, the second set of sensing elements configured to provide a second set of detector signals which respond to the second signal modulating scale pattern and which are indicative of a position of the detector along the second scale track; and the signal processor is configured to determine an absolute position of the detector along the scale based on detector signals provided by the first and second sets of sensing elements of the detector, wherein:

the second set of sensing elements comprises K spatial phase sensing elements and additionally at least a primary reference sensing element, wherein:

the K spatial phase sensing elements are configured to provide K respective signals and are at their K respective locations along the measuring axis direction on the detector, with each of the K locations corresponding to sensing a unique Kth spatial phase of the periodic pattern component and a corresponding Kth position along the gradual pattern variation component of the second scale track;

the primary reference sensing element is located at a primary reference location on the detector that is spaced apart along the measuring axis direction by a primary reference distance corresponding to an integer multiple of 360 degrees of spatial phase shift relative to a primary spatial phase sensing element of the K spatial phase sensing elements which provides a primary signal corresponding to a primary spatial phase of the periodic pattern component and a primary position along the gradual pattern variation component of the second scale track;

the primary reference sensing element is configured to provide a primary reference signal corresponding to the primary spatial phase of the periodic pattern component and a corresponding primary reference position along the gradual pattern variation component of the second scale track such that the primary signal and the primary reference signal include nominally similar signal contributions from the periodic pattern component of the second scale track and a difference between the primary signal and the primary reference signal is due to a difference in their signal contributions from the gradual pattern variation component of the second scale track; and the primary signal and the primary reference signal are not statically connected to one another and contribute to independent input signals for the signal processor, and the difference between the primary signal and the primary reference signal due to the primary reference distance is a primary signal difference indicative of a scale factor M2 for a second gradual signal variation exhibited by the second set of detector signals, wherein the second gradual signal variation is due to the gradual pattern variation component as a function of the position of the detector along the second scale track.

16. The electronic absolute position encoder of claim 15, wherein:

M2 is approximately equal to the negative of M1;

the periodic pattern component of each of the first and second signal modulating scale patterns is arranged according to a spatial wavelength L;

K=N, and the first and second sets of sensing elements are similar to one another; and the gradual pattern variation component of the first signal modulating scale pattern and the gradual pattern variation component of the second signal modulating scale pattern are similar to one another but reversed in polarity along the measuring axis direction.

17. The electronic absolute position encoder of claim 16, wherein:

the periodic pattern component of each of the first and second signal modulating scale patterns has the same spatial wavelength L; and the first and second sets of sensing elements are staggered from each other along the measuring axis direction by a distance which is equal to one half of the spatial wavelength L.

18. The electronic absolute position encoder of claim 17, wherein:

N=K=3, and ignoring integer multiples of 360 degrees of spatial phase shift, the N spatial phase sensing elements of the first set of sensing elements are separated along the measuring axis direction by a distance corresponding to 120 degrees of spatial phase shift, and the K spatial sensing elements of the second set of sensing elements are separated along the measuring axis direction by a distance corresponding to 120 degrees of spatial phase shift.

19. The electronic absolute position encoder of claim 16, wherein:
the signal processor is configured to determine the absolute position of the detector along the scale to a first resolution smaller than the spatial wavelength L, based on a third value of a relationship between a third set of detector signals, which exhibit a third gradual variation that depends on the first and second gradual signal variations, and a scale factor M3 for the third gradual signal variation that is determined based, at least partially, on the first signal difference and the primary signal difference; and
the signal processor is further configured to determine the absolute position of the detector along the scale to a second resolution smaller than the first resolution based on a fourth value of a relationship between the detector signals, wherein the fourth value of a relationship indicates a spatial phase position of the detector within a current spatial wavelength of the periodic pattern component of at least one of the first and second signal modulating scale patterns indicated by the first resolution absolute position.

20. The electronic absolute position encoder of claim 16, wherein:
the first gradual signal variation comprises a gradual variations in a DC offset value of a periodic detector signal provided by the first set of detector signals due the periodic pattern component of the first signal modulating scale pattern;
the second gradual signal variation comprises a gradual variations in a DC offset value of a periodic detector signal provided by the second set of detector signals due the periodic pattern component of the second signal modulating scale pattern; and
the first and second scale tracks and the first and second sets of sensing elements are configured such that the gradual variation in the DC offset values is at least as large as a variation of a peak-to-peak amplitude of the corresponding periodic detector signals over the same position change along the first or second scale track.

* * * * *